United States Patent [19]
Adams et al.

[11] Patent Number: 5,942,068
[45] Date of Patent: Aug. 24, 1999

[54] METHOD FOR MAKING A NON-METALLIC FIBER REINFORCED WHEEL

[75] Inventors: Thomas R. Adams, Huntington Beach; Gary R. Wittman, Costa Mesa, both of Calif.

[73] Assignee: Tiodize Company, Inc., Huntington Beach, Calif.

[21] Appl. No.: 08/920,949

[22] Filed: Aug. 29, 1997

[51] Int. Cl.⁶ .............................. B29C 70/40; B29C 65/00
[52] U.S. Cl. .................. 156/112; 152/323; 152/DIG. 18; 156/245; 264/250; 301/5.3; 301/64.7
[58] Field of Search ..................... 156/112, 245; 301/5.3, 64.7; 152/323, DIG. 18; 264/250, 319

[56] References Cited

U.S. PATENT DOCUMENTS

| | | | |
|---|---|---|---|
| 1,576,924 | 3/1926 | Malloy | 301/5.3 |
| 3,985,392 | 10/1976 | Bergmann et al. | 301/63 PW |
| 4,483,729 | 11/1984 | Fujisaki et al. | 156/222 |
| 5,503,466 | 4/1996 | Lew | 301/5.3 |
| 5,655,785 | 8/1997 | Lee | 280/11.2 |
| 5,692,809 | 12/1997 | Hook | 301/5.3 |

*Primary Examiner*—Jan H. Silbaugh
*Assistant Examiner*—Michael Poe
*Attorney, Agent, or Firm*—Morland C. Fischer

[57] ABSTRACT

A method for making a non-metallic, fiber reinforced wheel for an in-line skate and similar rolling articles. Resin impregnated carbon fibers are compression molded to form a high strength and very stiff (i.e. rigid) annular hub having a central channel extending longitudinally therethrough to accommodate an axle. Bearing cavities are formed at opposite ends of the central channel in which to receive and retain respective axle bearings. A hollow air pocket is established so as to extend around and through the interior of the hub in order to occupy a majority of the volume of the hut) and thereby reduce the overall weight of the wheel. A scalloped wheel retaining rim is formed around the circumference of the hub to which an outer urethane tire is bonded to enable the wheel to roll along a flat surface.

10 Claims, 4 Drawing Sheets

METHOD FOR MAKING A NON-METALLIC FIBER REINFORCED WHEEL

BACKGROUND OF THE INVENTION

1. Field of the invention

This invention relates to a method for making a light weight, high strength wheel having particular application for use in an in-line skate.

2. Background art

In-line skates are becoming increasingly popular for recreational and sports activities. However, because of the environment in which these skates are used, the wheels thereof are frequently exposed to high shear and other mechanical loads. As a consequence of existing methods of manufacture, the hubs of such wheels which surround and support the skate axle have been known to break so as to necessitate replacement of the wheel.

More particularly, the hubs of some skate wheels have been molded from a non-metallic urethane material. However, the urethane has proven to be undesirably soft and flexible. Consequently, these urethane wheels which have been manufactured in the past lack sufficient rigidity to withstand high loads, such that performance is adversely effected. That is to say, a urethane wheel is characterized by a relatively slow speed operation which is not altogether suitable for roller hockey and speed skating. Stronger and stiffer, high speed wheels that are also manufactured from a non-metallic material have proven to provide low traction and less control so as to also be unsuitable for roller hockey. Still other skate wheels have been manufactured from metal (e.g. aluminum). However, it is difficult, using conventional manufacturing techniques, to easily and satisfactorily bond non-metallic material to a metallic material to form a skate wheel. Moreover, metallic skate wheels are known to be relatively heavy and expensive to manufacture.

What is needed is a non-metallic wheel for an in-line skate, and the like, that will be relatively light weight, easy to produce and sufficiently strong and stiff so as to maximize performance (i.e. improve traction, increase speed and provide for better control) and reduce the risk of failure when exposed to high shear and other mechanical loads during use.

SUMMARY OF THE INVENTION

A method is disclosed for making a non-metallic, fiber reinforced wheel having particular application for use in an in-line skate. Carbon (i.e. graphite) fibers that have been impregnated with epoxy resin are compression molded to form an annular hub having a central channel extending longitudinally therethrough to accommodate an axle. Cylindrical bearing cavities are spaced axially from one another at opposites ends of the central channel in order to receive and retain respective axle bearings. Opposing inner and outer hub portions are fixedly connected together to form the hub with a hollow air pocket extending continuously and uninterruptedly therearound. The hollow air pocket occupies a majority of the volume of the hub to reduce the overall weight of the wheel. A scalloped wheel retaining rim is formed around the circumference of the annular hub over which a low profile urethane tire is bonded to enable the wheel to roll along a flat surface. A pair of tire flanges extend around the hub at opposite sides of the wheel retaining rim. The tire flanges and wheel retaining rim cooperate to reliably anchor the urethane tire to the hub and prevent the tire from sliding laterally therealong.

By virtue of the foregoing, the wheel of the present invention is as strong as aluminum but lighter in weight. The compression molded carbon fibers of the hub and the low profile nature of the urethane tire around the hub enable the wheel to have a high fatigue life, whereby to reduce the rate of failure and enable operation at higher speeds with better traction and improved control compared with conventional non-metallic wheels of solid cross section and metal (e.g. aluminum) wheels.

DESCRIPTION OF THE PREFERRED EMBODIMENT

Figure 4:
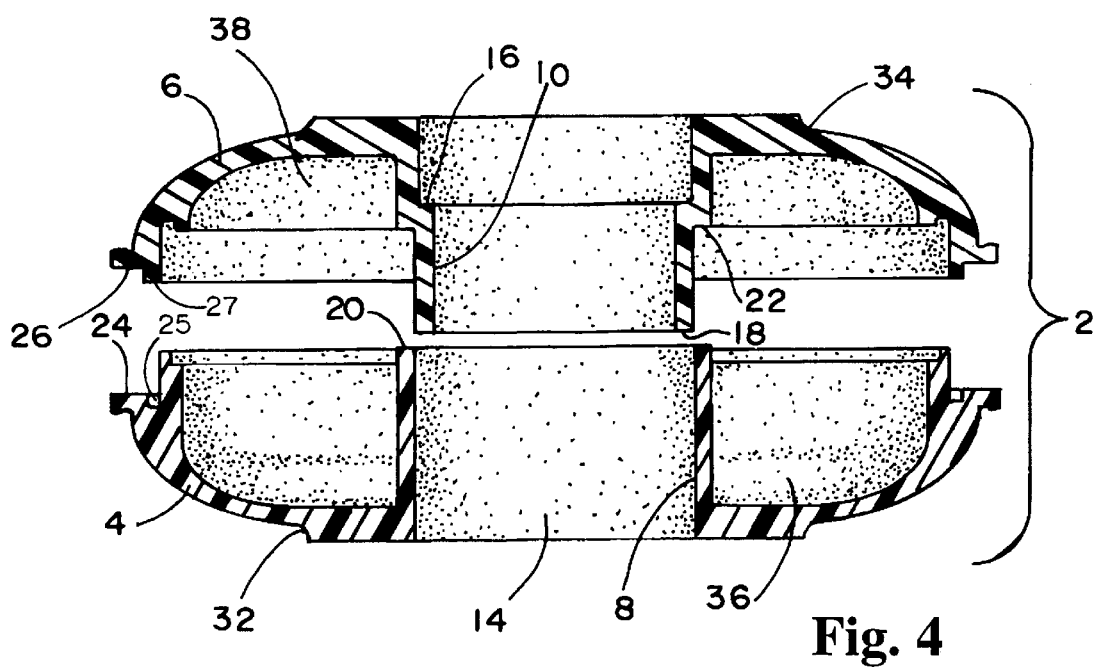
FIG. 4 is an exploded view showing outer and inner hub portions that are mated together to form the annular hub of FIG. 1.
Figure 3:
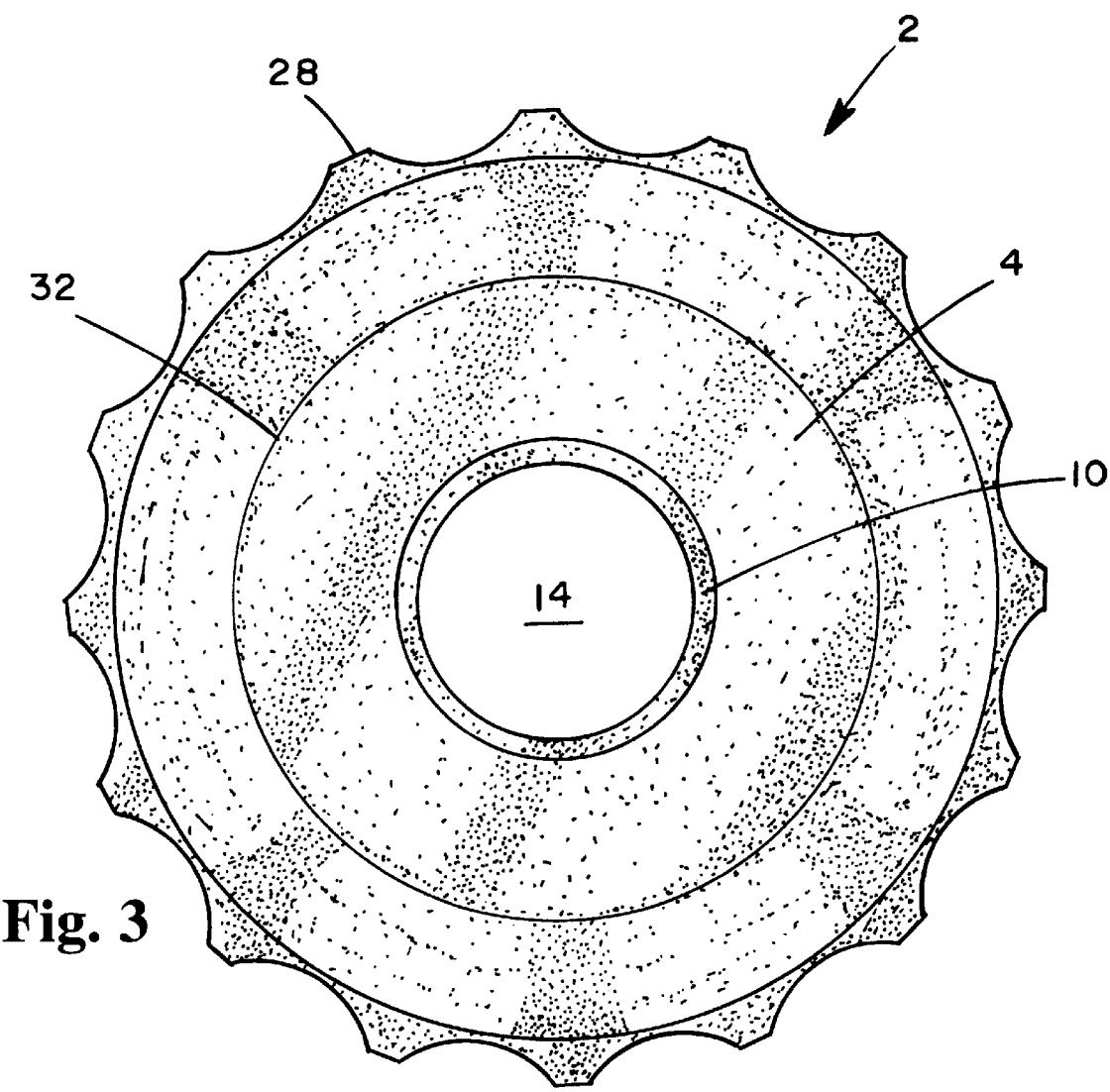
FIG. 3 is a side view of the annular hub of FIG. 1.

The method for making the non-metallic fiber reinforced wheel 1 of the present invention is now disclosed while referring concurrently to FIGS. 1–4 of the drawings where an annular hub 2 will be initially described. As is best shown in FIG. 4, the hub 2 of wheel 1 includes outer and inner hub portions (i.e. halves) 4 and 6 that are pushed towards and fixedly connected to one another. More particularly, the outer and inner hub portions 4 and 6 have respective bearing housings 8 and 10 that are coaxially aligned with one another relative to the longitudinal axis 12 of the wheel 1.

Figure 1:
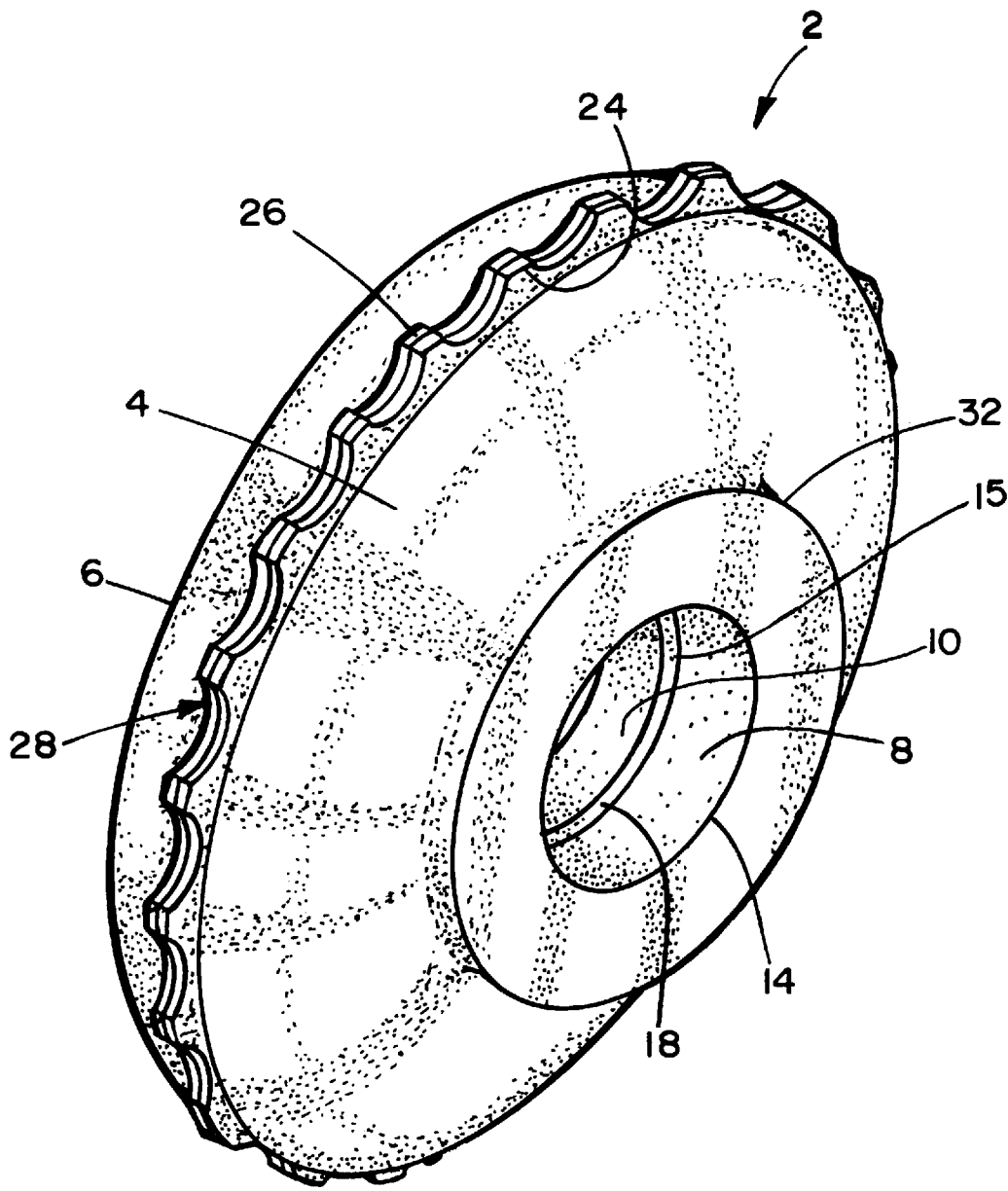
FIG. 1 is a perspective view of an annular, non-metallic fiber reinforced hub which forms the wheel of the present invention.
Figure 2:
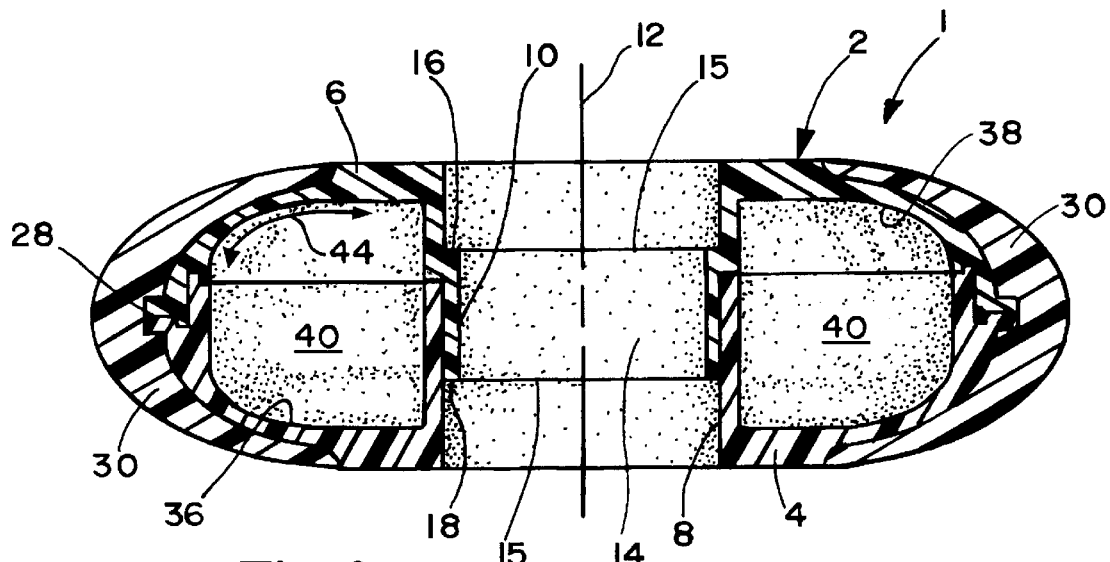
FIG. 2 is a cross section of the wheel of this invention showing the annular hub of FIG. 1 surrounded by an outer tire.

In the assembled configuration of FIG. 2, the outer and inner bearing housings 8 and 10 of hub 2 are connected together to define a longitudinally extending central channel 14 with cylindrical bearing cavities 15 spaced axially from one another and located at opposite ends of the central channel 14. As will soon be described, the bearing cavities 15 are suitably sized to receive respective bearings, such as ball bearings (not shown), which are adapted to accommodate and support an axle (also not shown) of the type that is common to an in-line skate. However, it is to be expressly understood that the hub 2 and the assembled wheel 1 described herein can also be used with carts, skate boards, baskets, and other wheeled rolling articles. Moreover, the actual size (i.e. diameter) of the central channel 14 will depend upon the application of the wheel 1 and the corresponding size of the wheel bearings.

The inner bearing housing 10 of inner hub portion 6 has a pair of bearing stops 16 and 18 that are spaced axially from one another to establish the cylindrical bearing cavities 15 at opposite ends of central channel 14. In the assembled wheel configuration of FIG. 2, the bearing stops 16 and 18 of inner bearing housing 10 engage the axle bearings so as to hold the bearings in place within their respective cavities 15 of central channel 14. Moreover, the outer and inner bearing housings 8 and 10 have opposing abutments 20 and 22 (best shown in FIG. 4) that are adapted to slide towards and engage one another to hold the outer and inner hub portions 4 and 6 in proper alignment so as to define the central channel 14 and enable the hub 2 to more evenly distribute the physical forces that are generated during use of the wheel 1.

Each of the outer and inner hub portions 4 and 6 has a scalloped edge 24 and 26 extending around the outer periphery thereof. Moreover, and as is best shown in FIG. 4, the edge 24 of outer hub portion 4 has a groove 25 formed therein that is sized to receive a lip 27 that is formed in the edge 26 of inner hub portion 6. In the assembled relationship, when the outer and inner hub portions 4 and 6 are mated together with abutments 20 and 22 engaging one another, the scalloped edges 24 and 26 of hub portions 4 and 6 are moved into face-to-face alignment so that the lip 27 of edge 26 is received by the groove 25 in edge 24, whereby to establish a scalloped tire retaining rim 28 extending circumferentially around the wheel 1 (best shown in FIG. 1). Although a scalloped tire retaining rim 28 is preferred, it is to be understood that a tire retaining rim without scallops formed therearound may also be used. In fact, the hub 2 can be manufactured with a tire retaining rim eliminated altogether.

Figure 5:
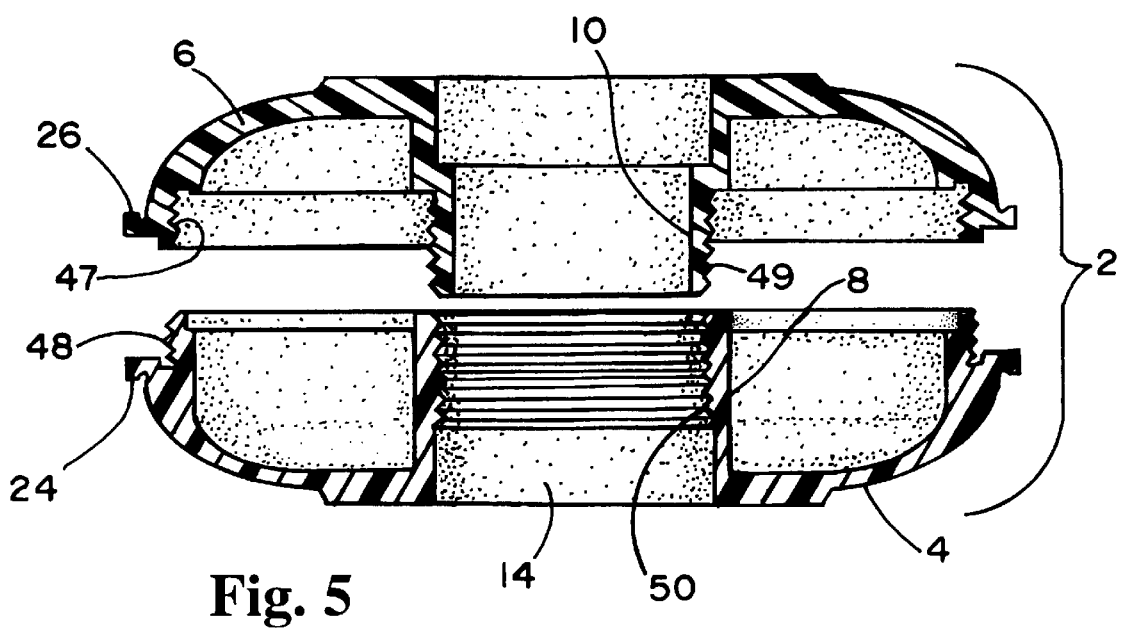
FIG. 5 shows a modified embodiment of the outer and inner hub portions of FIG. 4.

Referring briefly to FIG. 5 of the drawings, the outer and inner hub portions 4 and 6 may be adhesively bonded together. Alternatively, sets of complementary screw threads 47 and 48 and/or 49 and 50 may be molded into the respective edges 24 and 26 of the hub portions 4 and 6 and into the opposing outer and inner bearing housings 8 and 10 to permit the hub portions 4 and 6 to be rotated into mating (i.e. screw threaded) engagement with one another.

According to the preferred embodiment, the tire retaining rim 28 of wheel 1 is covered by a relatively low profile tire 30 (shown in FIG. 2) that is formed from a conventional plastic material such as urethane, the durometer of which is determined by the application of the wheel (for racing, hockey, or to simply support a cart). The scalloped edge of the tire retaining rim 28 advantageously helps anchor the tire 30 to the hub 2 to complete the assembly of the wheel 1. By virtue of the low profile tire 30, the wheel 1 is adopted to provide better traction and improved control.

What is more, a cylindrical rim flange 32 and 34 rises outwardly from each of the outer and inner hub portions 4 and 6. Rim flanges 32 and 34 are aligned coaxially with the longitudinal axis 12 of central channel 14 so as to lie on opposite sides of and cooperate with tire retaining rim 28 to allow the urethane tire 30 to be more reliably bonded to the hub 2 while preventing the tire 30 from slipping laterally along the hub, whereby to reduce the shear loads to which the wheel 1 will be subjected during use.

As an important detail for making the annular hub 2 of wheel 1, each of the inner and outer hub portions 4 and 6 thereof has a hollow area 36 and 38 extending in the circumferential direction (best shown in FIG. 2). Therefore, in the assembled configuration of FIG. 2, when the outer and inner hub portions 4 and 6 are mated to one another, a continuous and uninterrupted air pocket 40 is established around and through the interior of the wheel 1. The hollow air pocket 40 of wheel 1 occupies a majority of the volume of the hub 2 and replaces the solid cross section that is common to conventional in-line skate hubs.

By virtue of the circumferentially extending air pocket 40, the weight of the wheel 1 of this invention can be reduced by as much as 50% relative to the weight of conventional wheels used for in-line skate applications. In addition, the hub 2 will be better able to absorb shock and other impact forces to which the wheel 1 will be exposed.

As another important detail for making the wheel 1, the hub 2 is formed from a fiber reinforced organic resin that undergoes compression molding rather than injection molding as is otherwise common to the manufacture of in-line skate wheels. In the preferred embodiment, carbon (i.e. graphite) fibers or any other high strength, high modulus fibers that are impregnated with epoxy resin, are compression molded to form the annular hub 2. The carbon fibers typically have a length of about one inch and a random alignment, although it is preferred that a majority of the fibers be aligned to follow the curvature of the hub 2 in the direction of the reference arrow 44 shown in FIG. 2.

By virtue of the foregoing, the carbon fibers make the final wheel assembly as strong as aluminum but: lighter in weight. The wheel 1 will also be relatively stiff, having high rigidity and no creep. Thus, the wheel 1 is advantageously characterized by a high fatigue life so as to reduce failure and the need to make frequent replacements, especially when the wheel is used in high load applications, including roller hockey, and the like. The carbon fibers also contribute to absorbing shock and dissipating heat such that the wheel 1 can be used at high speeds. What is more, by first removing the urethane tire 30, the hub 2 can be remolded to form a new hub or a new shape altogether.

It will be apparent that while a preferred embodiment of the invention has been shown and described, various modifications and changes may be made without departing from the true spirit and scope of the invention. Having thus set forth the preferred embodiment, what is claimed is:

1. A method for making a rigid, lightweight wheel for a rolling article, said method comprising the steps of:

molding a pair of opposing circular hub portions such that each of said pair of hub portions has an outer edge, a bearing housing spaced inwardly from said outer edge in a radial direction, and a hollow air pocket extending in a circumferential direction between said outer edge and said cylindrical bearing housing, where the outer edge of one hub portion of said pair of hub portions has a lip and the outer edge of the other hub portion of said pair of hub portions has a groove sized to receive said lip, and the bearing housing of one hub portion of said pair of hub portions is cylindrical and has an end forming an abutment, and the bearing housing of the other hub portion of said pair of hub portions has overlapping and adjoining cylindrical portions, one of said overlapping and adjoining cylindrical portions having an end forming another abutment and the other of said overlapping and adjoining cylindrical portions having a bearing stop formed at each end thereof;

mating said pair of opposing hub portions together to form an annular hub such that the hollow air pockets that extend in the circumferential direction around said pair of hub portions occupy a majority of the volume of said hub, with the cylindrical bearing housing of one hub portion of said pair of hub portions disposed inwardly of and lying against the one of the overlapping and adjoining cylindrical portions of the bearing housing of the other hub portion of said pair of hub portions having a bearing stop formed at each end thereof to establish a central channel through said hub in a longitudinal direction within which to receive an axle, with a cylindrical bearing cavity at each end of the central channel having one of the bearing stops, wherein the abutment at the end of the bearing housing of the one hub portion of said pair of hub portions engages said another abutment, and the lip at the outer edge of the said one hub portion of said pair of hub portions is received in the groove at the outer edge of the said other hub portion of said pair of hub portions and bonding a tire to the outer edges of said pair of hub portions of said annular hub to enable said wheel to roll along a flat surface.

2. The method recited in claim 1, wherein the step of molding said pair of hub portions comprises compression molding.

3. The method recited in claim 1, wherein the hollow air pockets of said pair of hub portions extend continuously and uninterruptedly around said annular hub in said circumferential direction.

4. The method recited in claim 1, wherein said pair of hub portions are molded from a fiber reinforced organic resin material.

5. The method recited in claim 1, wherein said pair of hub portions are molded from a material containing carbon fibers.

6. The method recited in claim 1, wherein a scalloped tire retaining rim is formed around the outer edge of each of said pair of hub portions during the step of molding said pair of hub portions for anchoring the tire to said annular hub during the step of bonding the tire to the outer edges of said pair of hub portions.

7. The method recited in claim 1, wherein a bearing cavity is formed within the cylindrical bearing housing of each of said pair of opposing hub portions during the step of molding said pair of hub portions such that a pair of said bearing cavities are spaced longitudinally form one another at opposite ends of said central channel through said annular hub.

8. The method recited in claim 7, wherein each of said bearing stops is adapted to engage and retain an axle bearing at a bearing cavity within the central channel through said annular hub.

9. The method recited in claim 1, wherein each of the bearing housings of said pair of hub portions is formed with a screw threaded surface during said step of molding said pair of hub portions, said bearing housings being coupled to one another by means of the respective screw threaded surfaces thereof during the step of mating said pair of hub portions together.

10. The method recited in claim 9, wherein each of the lip and the groove at the outer edges of said pair of hub portions is formed with a screw threaded surface during said step, of molding said pair of hub portions, said lip being coupled to said groove by means of the respective screw threaded surfaces thereof during the step of mating said pair of hub portions together.

* * * * *